United States Patent
Panelli et al.

(10) Patent No.: US 7,860,015 B1
(45) Date of Patent: Dec. 28, 2010

(54) METHODS AND APPARATUS FOR PHYSICAL AND LOGICAL SAN FABRIC ANALYSIS

(75) Inventors: John D. Panelli, Campbell, CA (US); Keerthi K. Arutla, Fremont, CA (US); Sesh Jalagam, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 795 days.

(21) Appl. No.: 11/640,741

(22) Filed: Dec. 18, 2006

(51) Int. Cl.
*G01R 31/08* (2006.01)
*H04L 12/28* (2006.01)

(52) U.S. Cl. .................................. 370/241; 370/254

(58) Field of Classification Search ............... None
See application file for complete search history.

(56) References Cited

U.S. PATENT DOCUMENTS

2006/0271677 A1* 11/2006 Mercier .................. 709/224
2007/0263640 A1* 11/2007 Finn ........................ 370/401
2007/0297428 A1* 12/2007 Bose et al. .............. 370/401

* cited by examiner

*Primary Examiner*—Ayaz R Sheikh
*Assistant Examiner*—Sori A Aga
(74) *Attorney, Agent, or Firm*—Chapin IP Law, LLC; Barry W. Chapin, Esq.

(57) ABSTRACT

A SAN connectivity advisor analyzes the physical connections of a physical fabric, identifies logical connections based on the physical connections and connectivity information, and applies a set of connectivity rules indicative of good or mandatory SAN connection practices. The connectivity advisor generates a report indicative of connections that may need or benefit from modification, typically an error message for each suspect connection found. The connectivity advisor applies the rules to each physical and logical connection to qualify the connection according to the rules, thus reflecting the actual configuration at the port-to-port connection level, rather than the conventional device-to-device level. Further, the connectivity advisor does not require an interoperability matrix or other database query of device interoperability. The generated results indicate suggested (warning) or mandatory (inoperative) actions for remedying particular connection anomalies, and in this manner, apply a consistent set of aggregated rules to each physical and logical SAN connection.

19 Claims, 11 Drawing Sheets

Error: WebA does not have physical connectivity to Array1. The devices require physical connectivity to each other for Storage Access. [Message 6008]

*Fig. 4a*

Error: WebA does not have a logical path (zoning) to Array1. The devices require a logical path for Storage Access. [Message 9201]

Warning: WebA does not have redundant physical connectivity to Array1. For high availability, it is recommended that the devices have at least one physical segment is a single point of failure. For high availability, it is recommended that the devices have at least two physical paths to each other. [Message 6009]

*Fig. 4b*

Error: WebA does not have a logical path (zoning) to Array1. The devices require a logical path for Storage Access. [Message 9201]

Warning: WebA does not have redundant physical connectivity to Array1. For high availability, it is recommended that the devices have at least one physical segment is a single point of failure. For high availability, it is recommended that the devices have at least two physical paths to each other. [Message 6009]

*Fig. 4c*

Error: WebA does not have a logical path (zoning) to Array1. The devices require a logical path for Storage Access. [Message 9201]

Warning: WebA and Array1 do not have at least two independent logical paths between them (paths with different end ports on both sides) for Storage Access. For improved availability, add another path that has different end ports on both sides. [Message 9203]

Fig. 4f

Warning: WebA and Array1 do not have at least two independent logical paths between them (paths with different end ports on both sides) for Storage Access. For improved availability, add another path that has different end ports on both sides. [Message 9203]

Fig. 4g

Warning: Although port HBA0 on WebA does have a logical path (zoning) to Array1, it does not have a redundant logical path (a path to 2 different ports on the target device). For higher availability, zone HBA0 to more than one port on Array1. [Message 9204]

METHODS AND APPARATUS FOR PHYSICAL AND LOGICAL SAN FABRIC ANALYSIS

BACKGROUND

In a storage area network (SAN), a SAN management application monitors and manages manageable entities in the SAN. Each of the manageable entities is a component, or resource, deployed with other SAN components in a particular configuration. The manageable entities include storage arrays, connectivity devices, and hosts. The manageable entities, or SAN entities, interconnect via a fabric of physical connections for transporting data between the SAN entities. The fabric of interconnections therefore defines a SAN infrastructure operable to provide data storage and retrieval services to users. In a large SAN, the fabric of physical interconnections can be substantial.

In a typical SAN, physical devices and physical connections are typically superimposed by a logical definition of entities that provides flexibility, security and integrity to the data storage operations. For example, a shadow set or RAID volume may be defined to provide redundant storage on multiple physical drives viewed as a single device. Or, SANs may be subdivided by functions or groups to distinguish particular users and the data they may access. Such logical definitions include, for example, zoning, mapping and masking of various entities. The logical definitions impose additional selectivity on top of the physical connections to promote particular uses and efficiency in the SAN specific to a particular user, enterprise, or organization.

An operational SAN, therefore, defines a set of physical and logical connections, often referred to as a fabric. In the SAN, the physical and logical fabrics present maintenance and optimization issues. In a large SAN, identifying and categorizing each of the connections is a substantial task. Further, several logical fabrics are often defined within a physical fabric. Since a physical connection may represent and support multiple logical connections, diagnostic efforts may often result in a complex set of symptoms and cause/effect analysis. As a SAN grows, the underlying physical and logic fabric continues to expand in complexity and size.

SUMMARY

A storage area network (SAN) includes many interconnected devices (SAN entities) for providing mass data storage and retrieval services. The SAN entities include storage arrays, switching devices, and hosts, and are interconnected in a SAN fabric of interconnections. Each device defining a SAN entity includes one or more ports. The physical fabric defining the wired connections includes the connections between a plurality of ports on each entity. Further, the SAN entities are responsive to a management application. The management application monitors the status of the various SAN entities (manageable entities) as well as the state of the fabric interconnecting the manageable entities. The SAN typically further categorizes logical connections on top of the physical connections. The logical connections effectively define subnetworks on the physical connectivity that implement selective transport (recognition) of the physical connections for implementing features such as zoning, LUN (Logical unit number) masking and mapping. SAN connectivity, therefore, encompasses a complex myriad of physical and logical connections for providing selective access and throughput in the SAN.

Configurations herein are based, in part, on the observation that conventional SAN health analyzes static configuration data from configuration files, and may not encompass dynamic run-time states of devices and connections between them. Startup and discovery practices analyze SAN configurations from interoperability criteria drawn from a database. While helpful for hardware deployment, this approach suffers from the shortcoming that the ongoing connectivity information, capturing the physical and logical connections between the devices, may not be adequately reflected at a device to device level of analysis. Accordingly, configurations herein substantially overcome this shortcoming by providing rule based connectivity analysis of the individual port-port connections, and identifying configuration issues based on the individual connections between the devices. Such rule based analysis transcends a static configuration database and interoperability data by examining physical and logical connectivity of the SAN, and identifying specific connections exhibiting less than optimal (warning) or potentially inoperable (error) connections.

In a SAN, particularly a large SAN, it is beneficial to monitor and maintain the physical and logical connections in an optimal state of network "health." Different arrangements of the physical and logical connections may provide greater fault tolerance, efficiency and throughput, while certain inoptimal arrangements may tend to promote bottlenecks, increase failure likelihood, or simply render a connection inoperative. Accordingly, it is beneficial to gather the set of physical and logical connections (connectivity), and apply a set of connectivity rules to analyze failures, potential failures, and less-than-optimal arrangements. Practices such as multiple redundant connections provide a failover route and prevent single points of failure. Erroneous zoning designations may render certain connections inaccessible. Systematic application of the connectivity rules pinpoints problem areas and potential issues, and presents a SAN operator with a consistent report addressing all physical and logical connections for a particular fabric.

Accordingly, configurations herein substantially overcome the above shortcomings by providing a SAN connectivity advisor operable to analyze the physical connections of a physical fabric, identify logical connections based on the physical connections and connectivity information, and apply a set of connectivity rules indicative of good or mandatory SAN connection practices. The connectivity advisor generates a report indicative of connections that may need or benefit from modification, typically an error message for each suspect connection found. The connectivity advisor applies the rules to each physical and logical connection to qualify the connection according to the rules, thus reflecting the actual configuration at the port-to-port connection level, rather than the conventional device-to-device level. Further, the connectivity advisor does not require an interoperability matrix or other database query of device interoperability. The generated results indicate suggested (warning) or mandatory (inoperative error) actions for remedying particular connection anomalies, and in this manner, apply a consistent set of aggregated rules to each physical and logical SAN connection.

The manageable entities may be interconnected by various types of physical links, typically FibreChannel (FC), although the connections may include Small Computer Systems Interface SCSI, iSCSI, or IP (Internet Protocol) connections as well. Therefore, connectivity generally defines the set of physical and logical connections between manageable entities in the SAN. In a typical example scenario, a number of hosts connect to a plurality of storage arrays via a physical fabric. The physical fabric includes one or more logical fabrics encompassing the logical connections in each subnetwork represented by the respective logical fabric. In the realm of storage area networks, the set of connections coupled with the physical and logical designations, combined with access and security features such as zoning, masking, and mapping, may be cumbersome to diagnose and analyze. Issues that may arise include lack of paths between entities or ports, lack of redundancy, invalid naming, and single points of failure, to name several. The rules disclosed below attempt to analyze a SAN for these and other issues defined by the connectivity rules.

In further detail, configurations discussed herein analyze a storage area network by determining a connectivity of a storage area network (SAN), such that the connectivity defines interconnections between manageable entities in the SAN, and computes, from the connectivity, physical paths between the manageable entities. The connectivity is indicative of at least one physical connection between manageable entities in the SAN, in which that the physical connection defines a path between manageable entities. A connectivity advisor computes, from the physical paths and logical connectivity information, logical paths between the manageable entities, and applies a connectivity policy to the physical paths and logical paths, such that the connectivity policy is operable to qualify paths between manageable entities. The connectivity advisor reports the results of the path qualification to a user or operator via a console graphical user interface GUI).

In the example configuration, the path qualification is indicative of the operability of the paths during adverse conditions, such that the paths typically include at least one of physical paths or logical paths. The applied connectivity policy includes rules, in which the rules include physical connectivity rules and logical connectivity rules. Employing the rules, qualifying the paths further encompasses applying a rule concerning connectivity between manageable entities, computing a result based on the physical connectivity and logical connectivity between the manageable entities, and determining a severity of the result.

The logical connectivity information is indicative of logical paths, in which the logical paths include a subset of physical connections defined by at least one of zoning, LUN masking and mapping. In the example SAN discussed below, zoning is indicative of a mapping of ports in a switch connecting manageable entities, LUN masking is indicative of a set of storage devices in a storage array accessible to a particular manageable entity, and mapping is indicative of a host corresponding to a LUN. Further criteria embodied in the connectivity rules is discussed below.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In a storage area network, particularly a large SAN, it is beneficial to monitor and maintain the physical and logical connections in an optimal state of network "health." Different arrangements of the physical and logical connections may provide greater fault tolerance, efficiency and throughput, while certain inoptimal arrangements may tend to promote bottlenecks, increase failure likelihood, or simply render a connection inoperative. Accordingly, it is beneficial to gather the set of physical and logical connections (connectivity), and apply a set of connectivity rules to analyze failures, potential failures, and less-than-optimal arrangements. Practices such as multiple redundant connections provide a failover route and prevent single points of failure. Erroneous zoning designations may render certain connections inaccessible. Systematic application of the connectivity rules pinpoints problem areas and potential issues, and presents a SAN operator with a consistent report of all physical and logical connections for a particular fabric.

The example SAN environment discussed herein employs a SAN connectivity advisor operable to analyze the physical connections of a physical fabric, identify logical connections based on the physical connections and connectivity information, and apply a set of connectivity rules indicative of good or mandatory SAN connection practices. The connectivity advisor generates a report indicative of connections that may need or benefit from modification, typically an error message for each suspect connection found. The connectivity advisor applies the rules to each physical and logical connection to qualify the connection according to the rules, thus reflecting the actual configuration at the port-to-port connection level, rather than the conventional device-to-device level. Further, the connectivity advisor does not require an interoperability matrix or other database query of device interoperability. The generated results indicate suggested (warning) or mandatory (error remedying) actions for remedying particular connection anomalies, and in this manner, apply a consistent set of aggregated rules to each physical and logical SAN connection.

Figure 1:
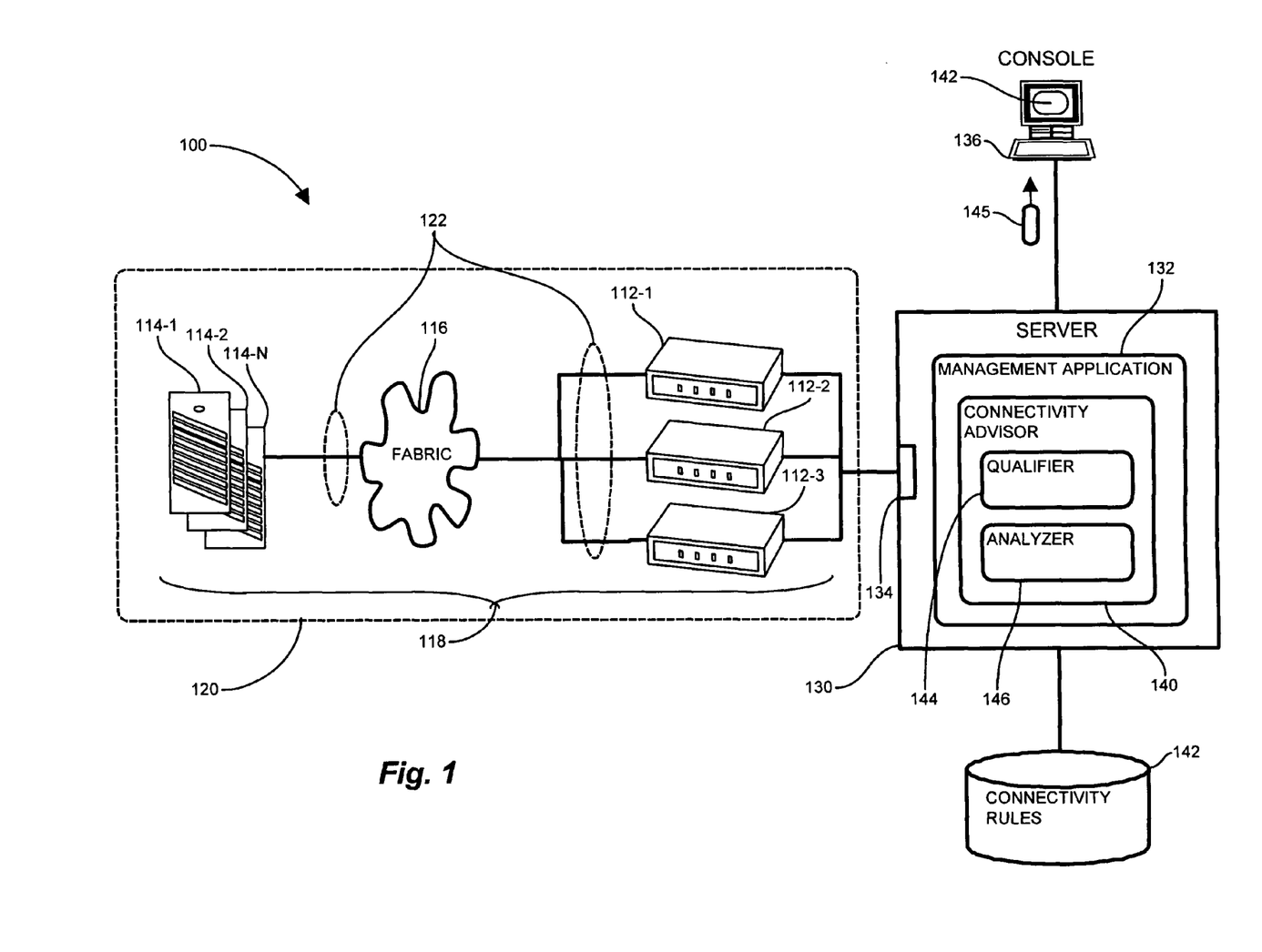
FIG. 1 is a context diagram of an exemplary managed information environment suitable for use with the present invention.

FIG. 1 is a context diagram of an example managed information environment suitable for use with the present invention. Referring to FIG. 1, a managed information environment 100 includes hosts 112-1 . . . 112-3 (112 generally) connected to storage arrays 114-1 . . . 114-3 (114 generally) by a fabric 116 of interconnections, typically defined by physical interconnections of switching devices such as routers, bridges and hubs. The hosts 112 and storage arrays 114 are manageable entities 118 in a storage area network 120, including manageable entities 118 in the fabric 116. Each of the manageable entities 118 is responsive to a management application 132 operable on a management server 130, connected to the storage area network (SAN) 120 via an interface 134. The management server 130 interfaces to a console 136 for operator interaction The management application 132 is responsive to a graphical user interface (GUI) 142 on the console 140. The management application 132 includes a connectivity advisor 140 operable to assess and analyze connections 122 between the manageable entities 118 via the fabric 116. The connectivity advisor 140 is responsive to a set of connectivity rules 142, and includes an analyzer 146 operable to interrogate the SAN 120 and determine the status of a connection 122, and a qualifier 144 operable to apply the connectivity rules 144 to a path (i.e. connection 122) between manageable entities for determining results of the applying the rule to the path. Identification of the current configuration and interconnections may be performed by any suitable mechanism, such as querying a database of known connections, probing individual connections, or other suitable mechanism. In the example configuration, the results 145 include a message and a severity indicative of the issue concerning the path (i.e. no logical connection, invalid name, etc.), operable to be displayed or reported to a user or operator via a graphical user interface (GUI) 142.

Figure 2:
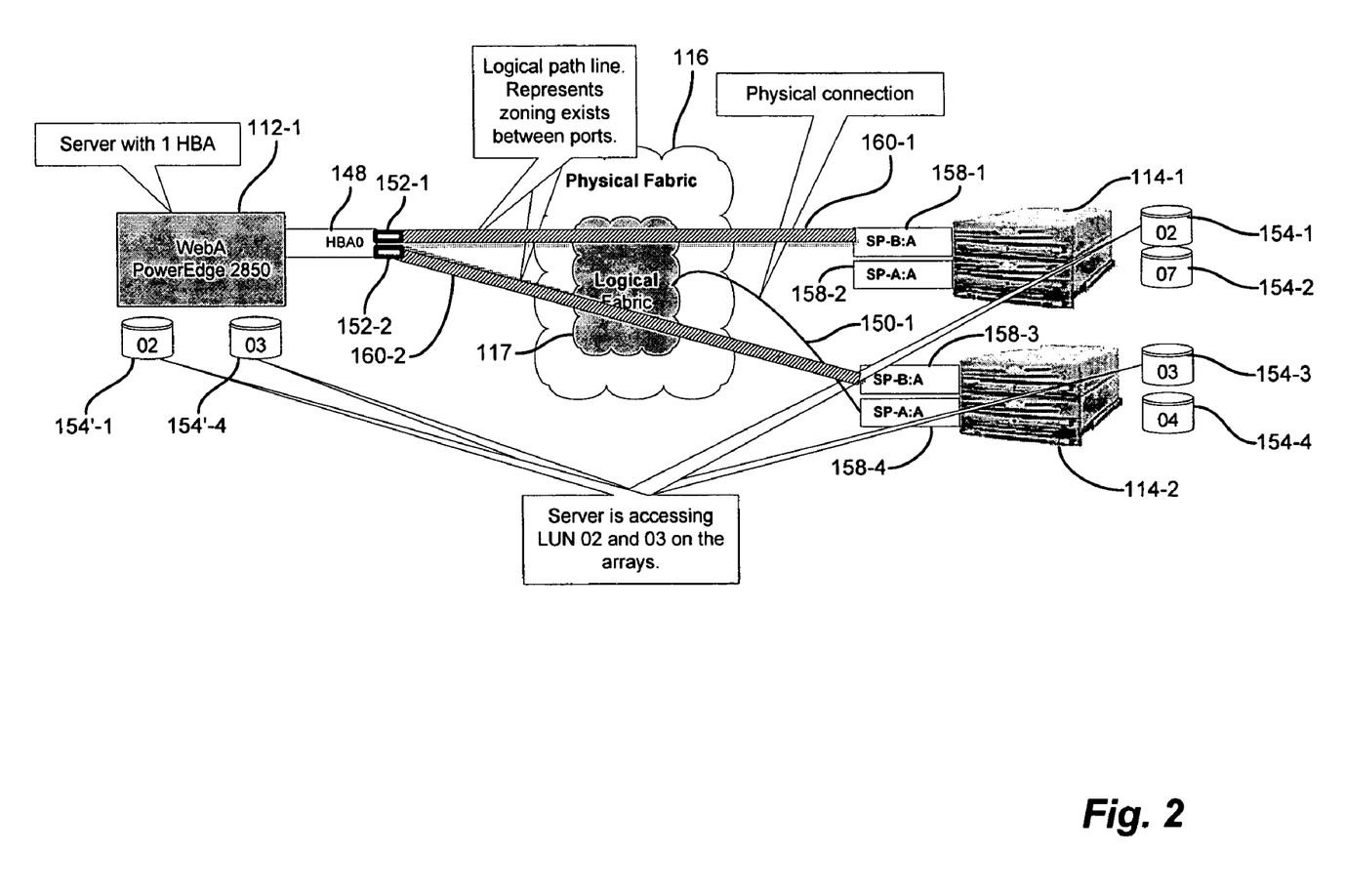
FIG. 2 is a block diagram of SAN entity connectivity in the environment of FIG. 1

FIG. 2 is a block diagram of SAN entity connectivity in the environment of FIG. 1. Connectivity refers to the set of logical and physical connections in a fabric 116. Often, in a storage area network 120, it is desirable to define a set of logical connections that are visible as a subnetwork or zone. The set of logical connections typically recognizes a subset of ports on a particular device as belonging to a zone. Therefore, the set of logical connections recognized by a particular set of ports and devices defines a subnetwork as a zone. Referring to FIGS. 1 and 2, a host 112, or server, is operable to provide access to storage volumes 154-1 . . . 154-4 on storage arrays 114. Each server 112-11 provides user access to particular storage volumes 154'-1,154-'4 based on the particular physical connections 150 and logical connections 160 afforded that server via the respective physical and logical fabrics 116, 117. Note that the physical connections 122 to the fabric define the physical paths 150-1 (150 generally), which the logical paths 160-1,160-2 (160 generally) are based on. Thus, a logical path 160 may include multiple physical connections 122. Each host 112 has at least one host bus adaptor (HBA) 148, each having one or more ports 152-1 . . . 152-2 (152 generally). Each storage array 114 likewise has one or more ports 158-1 . . . 158-N (158, generally). The physical connections 150 define the physical fabric 116 by the collective set of paths 150-N between available ports 152,158. The logical fabric 117 further refines the physical fabric 116 by identifying particular logical connections 160 over the available physical connections 150. Selectivity attributes such as zoning, LUN masking and device mapping determine the logical connections 160 available by a particular port 152, 158, typically based on access privileges or other usage architectures afforded particular groups of users. Thus, a physical fabric 116 may include multiple logical fabrics 117 by designating logical connections as belonging to a particular zone, logical unit (LU) or other access criteria. It should be apparent that each logical connection 160 employs one or more physical connections 150 between the pertinent ports 152 158.

Figure 3:
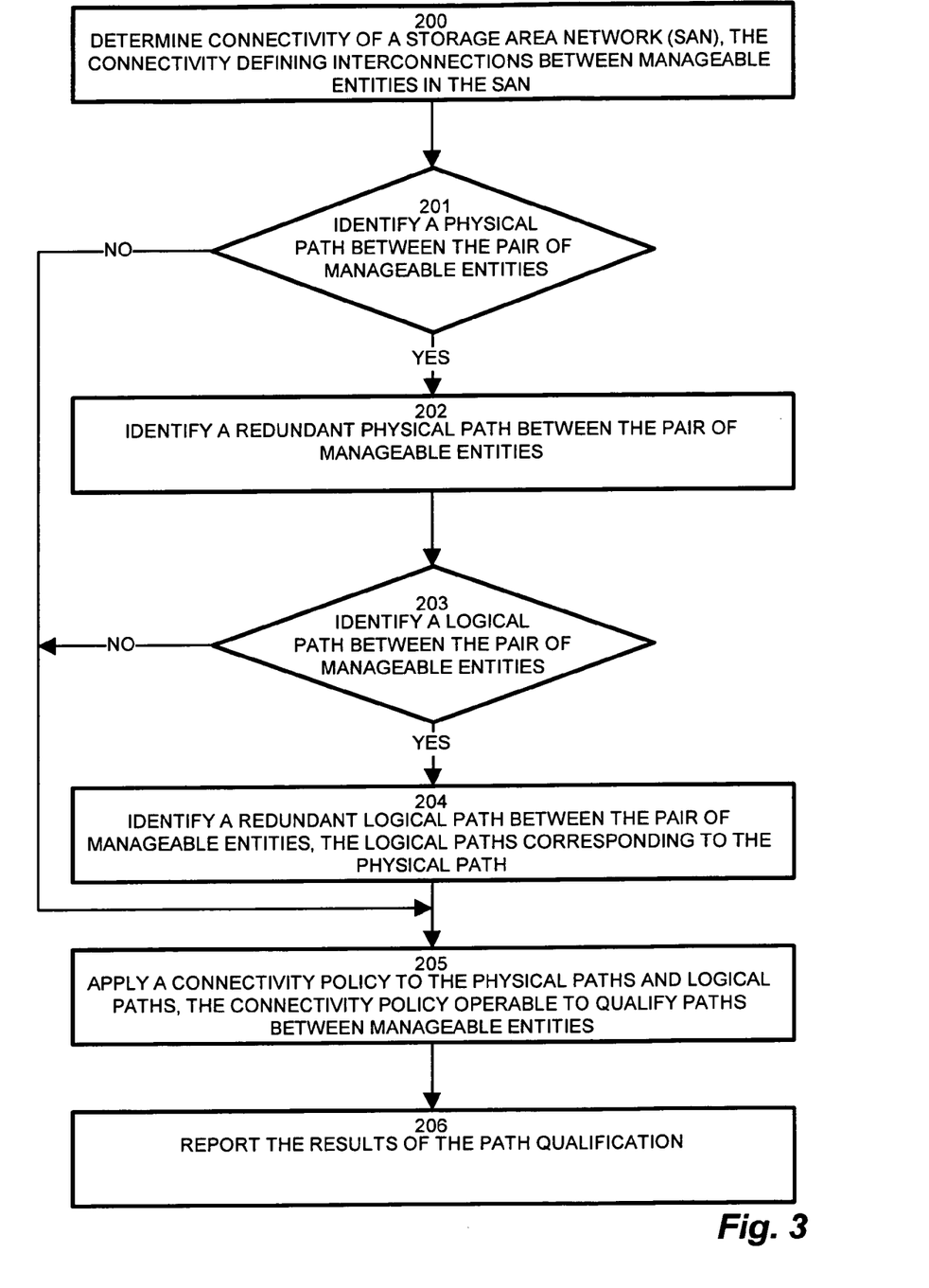
FIG. 3 is a flowchart of rule based physical and logical connectivity among the SAN entities of FIG. 2.

FIG. 3 is a flowchart of rule based physical and logical connectivity among the SAN entities 118 of FIG. 2. Referring to FIGS. 1-3, at step 200, the connectivity advisor determines a connectivity of the storage area network (SAN) 120, in which the connectivity defines interconnections 122 between manageable entities 118 in the SAN 50, as depicted at step 200. The analyzer 146 determines the raw connectivity information (i.e. wired port to port connections), and the qualifier 144 applies the connectivity rules 142 for qualifying the port links according to "best practice" rules. Therefore, the connectivity rules 142 indicate not only raw physical connections, but desirable and undesirable arrangements such as redundancy and fault tolerant arrangements. For each pair of SAN entities 118 for which a connection is purported, the analyzer 146 identifies a physical path 122 between the pair of manageable entities 118, as shown at step 201. If no physical path is found, control transfers to step 205 to report the results, as there can be no logical connection 160 if there is no physical connection 150. The qualifier 144, responsible for applying the connectivity rules 142, then attempts to identify a redundant physical path 122 between the pair of manageable entities 118, as shown at step 202, as redundancy eliminates a single point of failure should one of the connections 122 experience a problem. A logical path 160 is then sought between the logical entities 118, as depicted at step 203. If no logical path 160 exists, then control transfers to step 205 as above. If the analyzer 146 identifies a logical path between the pair of manageable entities 118, then the analyzer 146 attempts to identify a redundant logical path 160 between the pair of manageable entities, as disclosed at step 204, in which the logical paths 160 correspond to the physical path 150 (i.e. if there is no underlying physical path, a logical path cannot exist. The analyzer 146 applies the rules of the connectivity policy (connectivity rules 142) to the physical paths 150 and the logical 160 paths, such that the connectivity policy is operable to qualify paths between manageable entities 118, as depicted at step 205. The connectivity advisor 140 then reports the results of the path qualification via the GUI 142 coupled to the management application 132, as shown at step 206. The rules 142 applied by the connectivity policy identify errors and warnings indicative to facilitate corrections and enable optimal arrangements of SAN configuration, as discussed further below with additional connectivity rules 142.

Figure 4A:
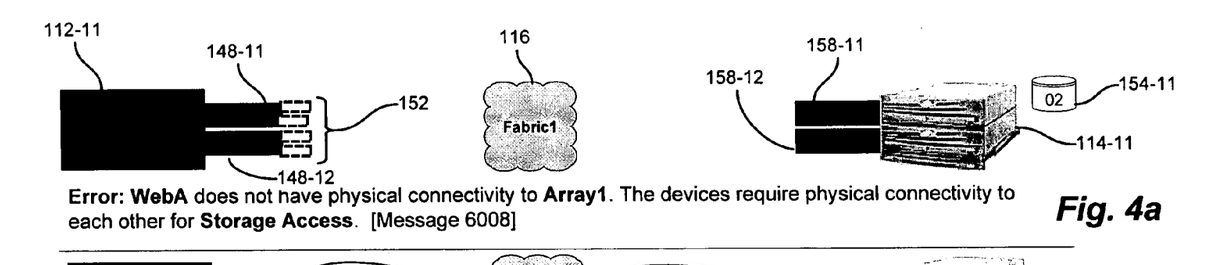
FIGS. 4a-4h are a diagram of a connectivity analysis using example rules as in FIG. 4.

FIGS. 4a-4h are a diagram of a connectivity analysis using example rules as in FIG. 4. Referring to FIGS. 1, 3 and 4a-4h, an example scenario depicting a progressive application of a particular set of connectivity rules 142 of FIG. 3 is shown. In FIG. 4a, host 112-11 does not have physical connectivity to the storage array 114-11. As shown in FIG. 4, there are no physical paths (connections) from ports 152 on either of host bus adaptors (HBAs) 148-11,148-12 (148 generally) to the physical fabric 116. The qualifier 144 applies a particular rule that specifies that the host device 112-11 requires physical connectivity to the storage array devices 114-11 for storage access.

Figure 4B:
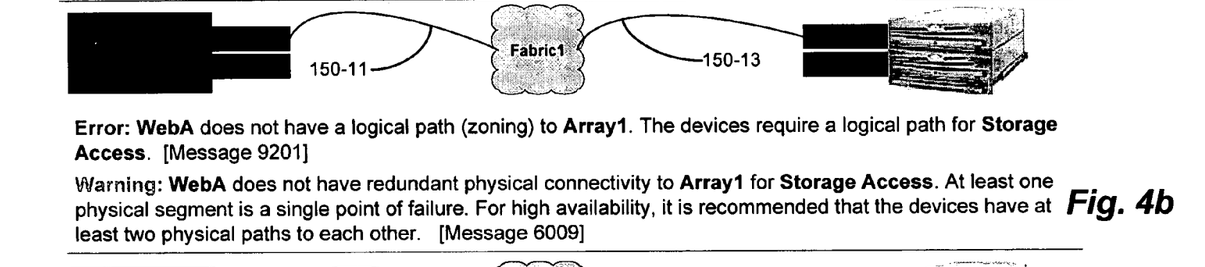
Figure 4C:
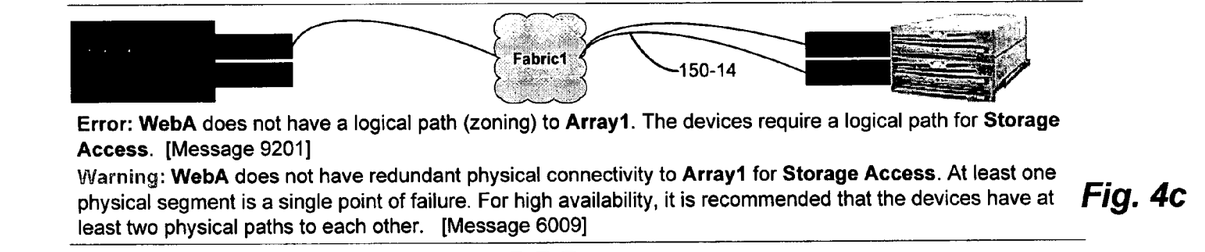

At FIG. 4b, a physical path is established by connections 150-11 and 150-13, however there is no logical path 160 specified. Accordingly, the qualifier 144 applies a particular rule that specifies an error because there is no logical connectivity between the host 112-11 ports 152 and the storage array 114-11. Further, another rule specifies a warning that there is no redundant physical connection between the host 112-11 and the storage array 114-11. At FIG. 4c, an additional physical connection 150-14 is established from the fabric 116, however there is still no logical path 160. Further, there is still no redundant physical path because the connection 150-11 from the host 112-11 to the storage array 114-11 represents a single point of potential failure.

Figure 4D:
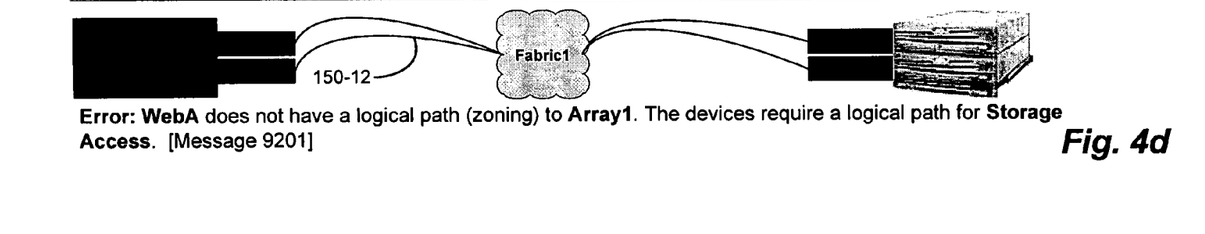
Figure 4E:
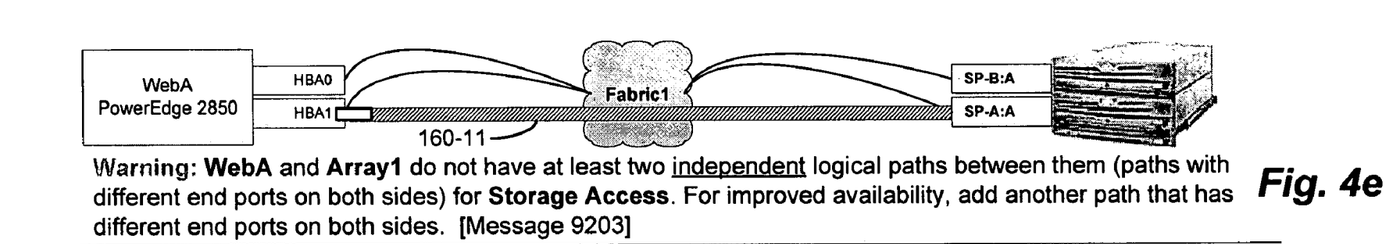
Figure 4F:
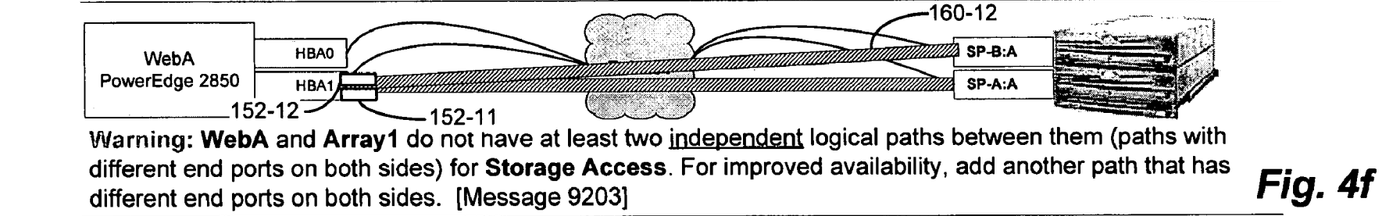
Figure 4G:
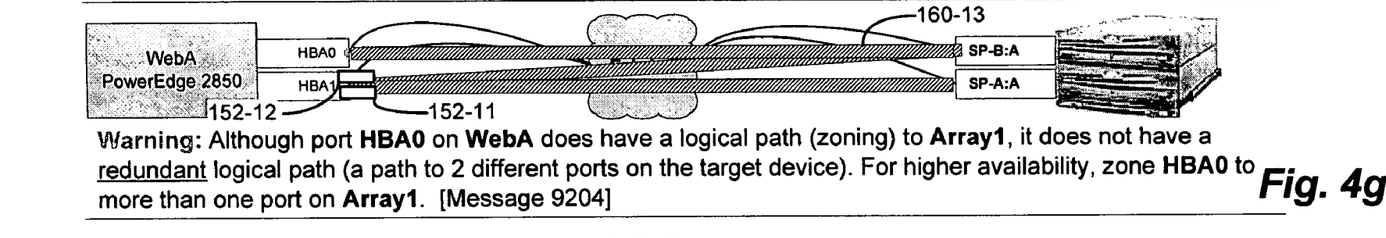
Figure 4H:
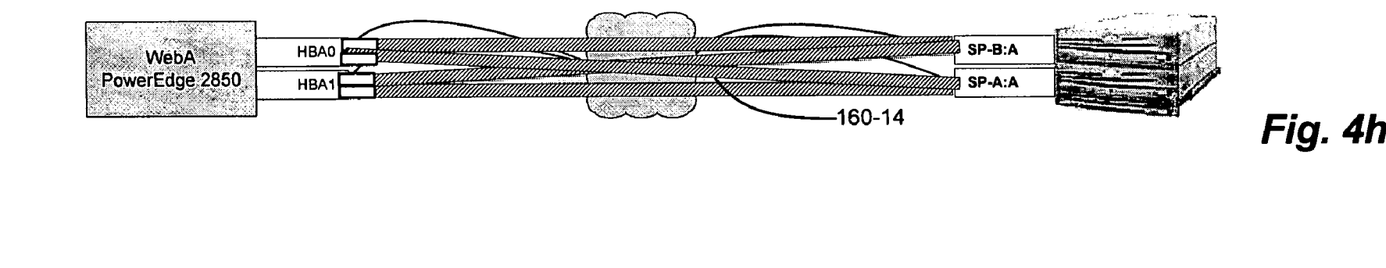
Figure 5:
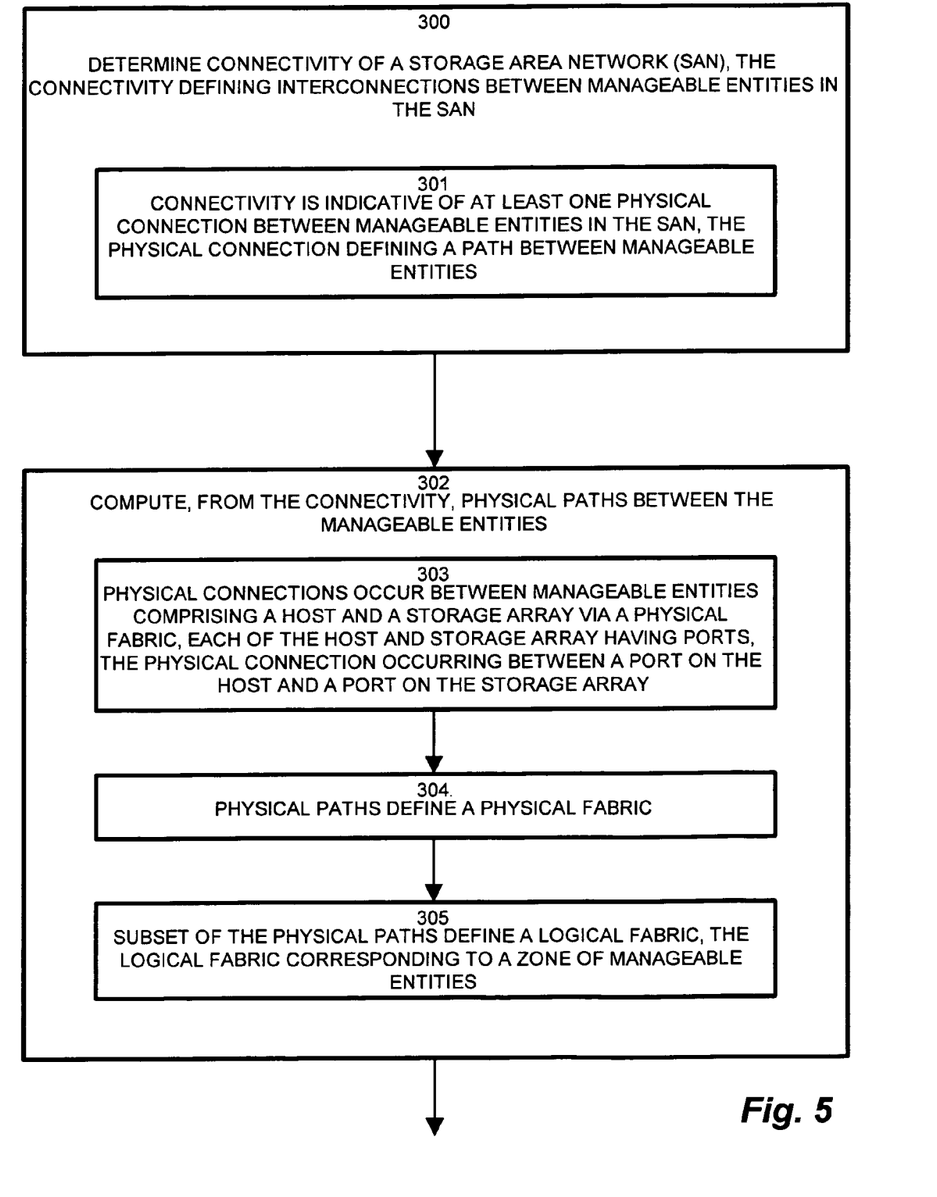
FIGS. 5-8 are a flowchart of rule based analysis of connectivity as depicted in FIGS. 5a-5n.
Figure 6:
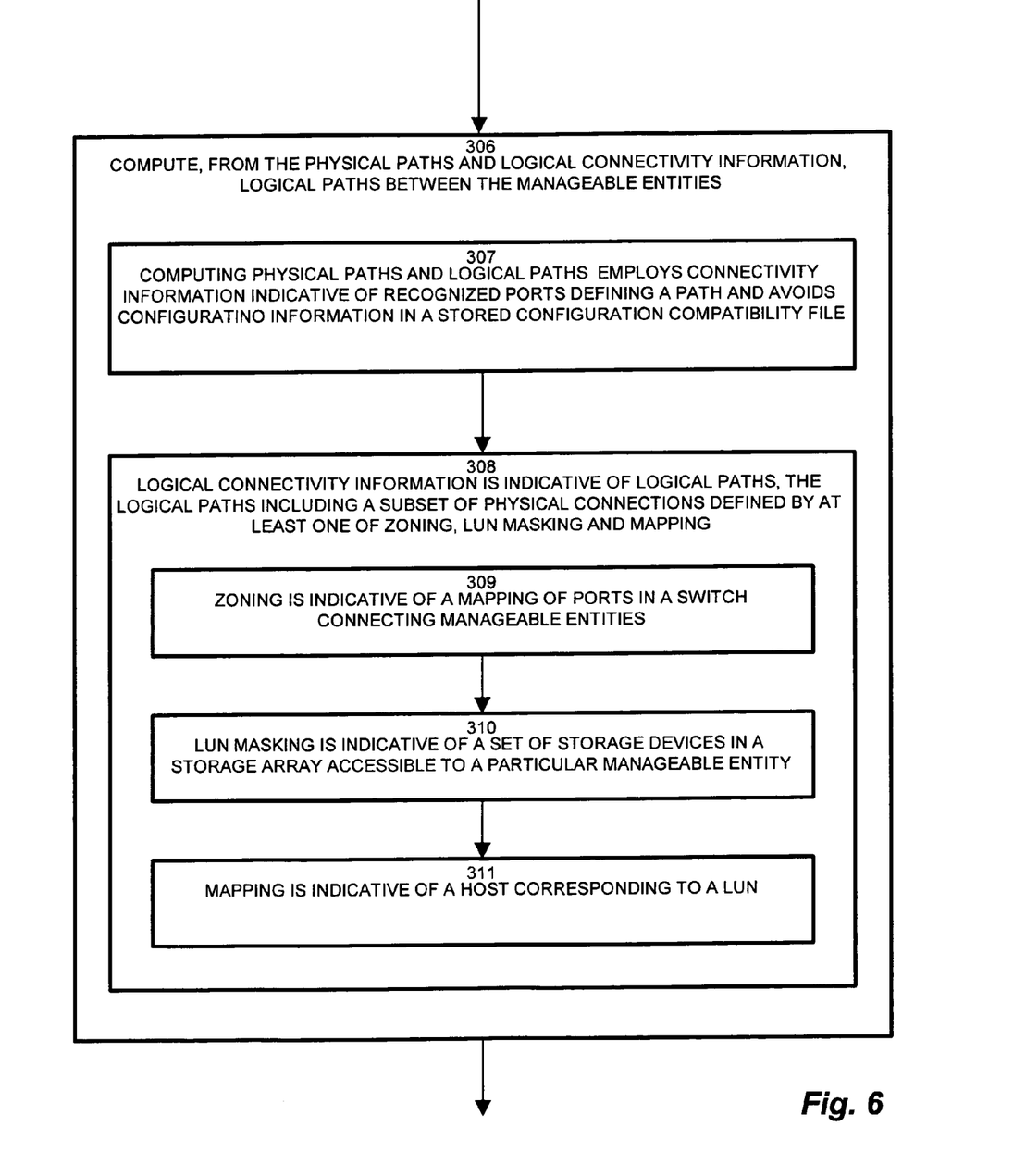
Figure 7:
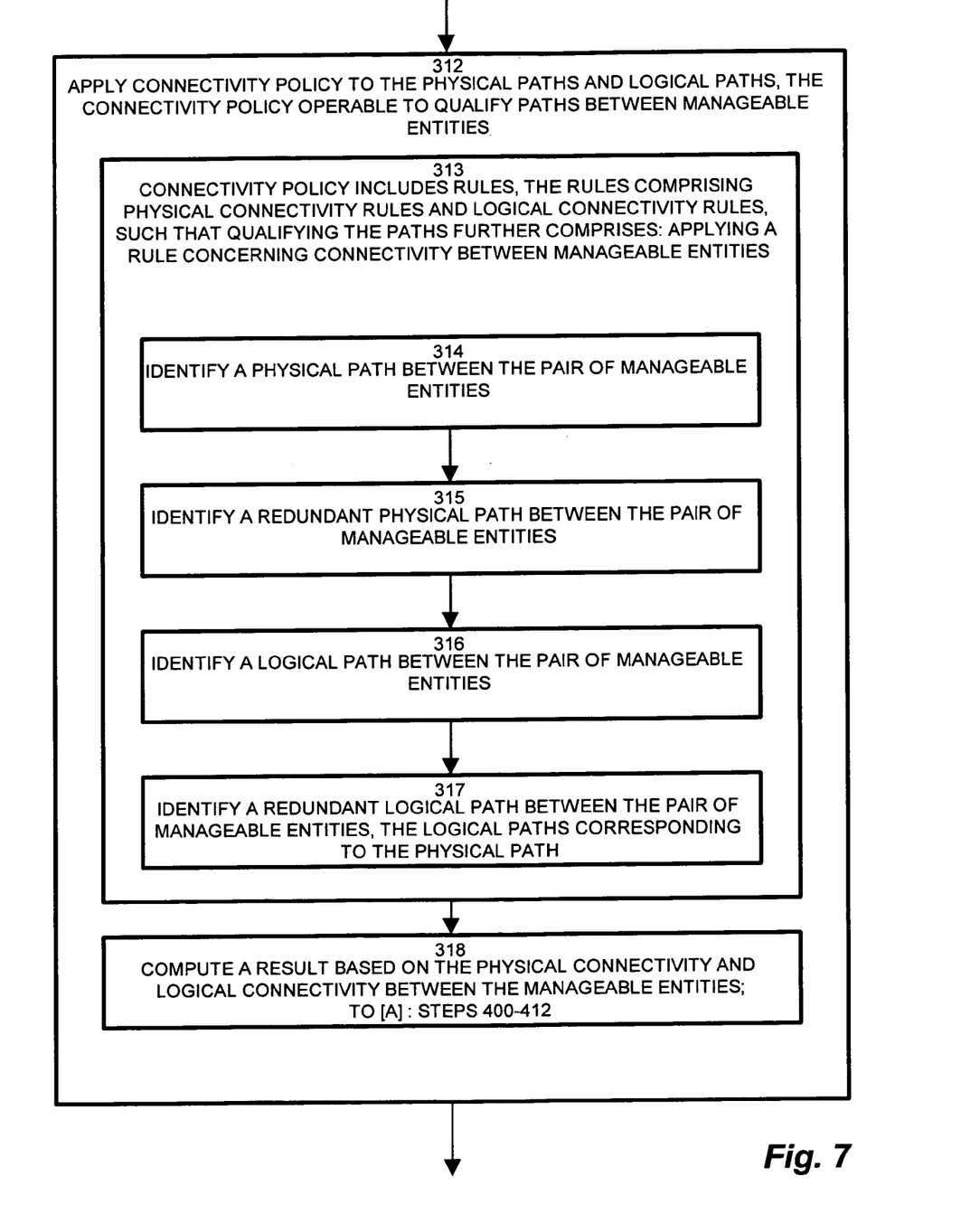
Figure 8:
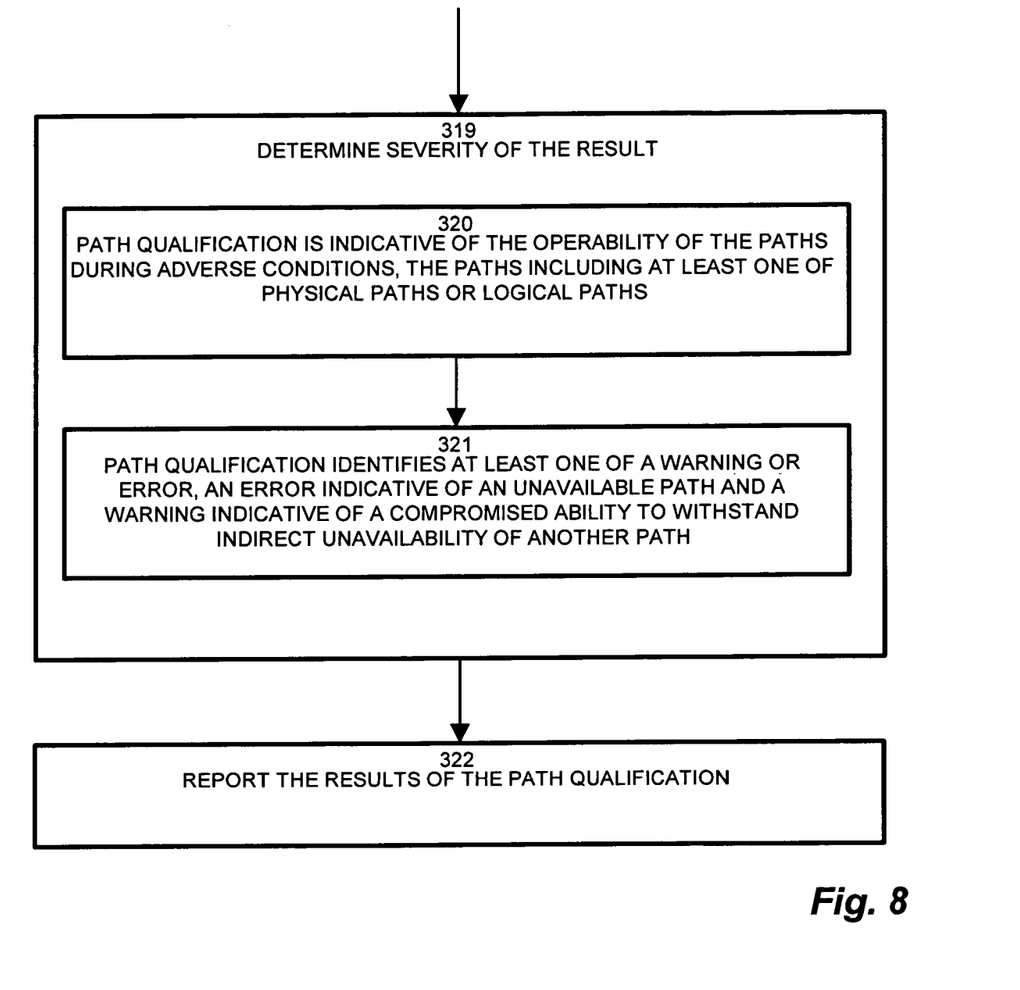

At FIG. 4d, redundant physical paths are established with the addition of connection 150-12 from the port 152-12 to the physical fabric 116, however there is still no logical path 160. FIG. 4e shows a logical path 160-11 between host 112-11 and storage array 114-11, however presents a warning because there are not two independent logical paths 160. FIG. 4f shows independent logical paths 160-11 and 160-12 connecting to storage array ports 158-11 and 158-12, however both share a common endpoint port 152-12 at the host 112-11, thus having a single point of potential failure. FIG. 4g presents multiple logical paths 160-11, 160-12 and 160-13, thus establishing the multiple independent logical paths 160 from more than one port 152, 158 on each entity 112-11, 114-11. However, port 152-11 does not exhibit redundant logical paths, i.e. a path to two different ports on the target device (storage array) 114-11. FIG. 4h resolves this warning by adding logical connection 160-14 and presents a particular arrangement satisfying the rules 142 because there are multiple, redundant logical paths 160-11, 160-12, 160-13 and 160-14 including at least two paths from each port 152 from the host 112 to the storage array 114-11.

FIGS. 5-9 are a flowchart of rule based analysis of connectivity as depicted in FIGS. 4a-4h. During typical operation, the qualifier 144 systematically qualifies each of the physical and logical paths 150, 152 (or lack thereof) based on the rules 142. Referring to FIGS. 1 and 5-9, the disclosed SAN management application 132 includes an encoded set of processor based instructions for performing a method for analyzing a storage area network performs steps including determining a connectivity of a storage area network (SAN), the connectivity defining interconnections between manageable entities in the SAN, as depicted at step 300. The connectivity is indicative of at least one physical connection 122 between manageable entities in the SAN, such that the physical connections 122 define a path 150 between manageable entities 118, as disclosed at step 301.

The analyzer 146 computes, from the connectivity, physical paths 150 between the manageable entities 118, as depicted at step 302. The physical connections 122 occur between manageable entities 118 comprising a host and a storage array via a physical fabric 116, each of the host 112 and storage array 114 having ports, the physical connection 122 occurring between a port 152 on the host and a port 158 on the storage array 114, as shown at step 303. The physical paths 150 define a physical fabric 116, as depicted at step 304, and a subset of the physical paths 150 may define, for example, a logical fabric 117, in which the logical fabric 117 corresponds to a zone of manageable entities 118, as disclosed at step 305.

The analyzer 146 computes, from the physical paths 150 and logical connectivity information, logical paths 160 between the manageable entities 118, as depicted at step 306. Computing physical paths 150 and logical paths 160 employs connectivity information indicative of recognized ports 152 defining a path (connection 122) and avoids configuration information in stored configuration compatibility files, as shown at step 307. The logical paths 160 overlaid on the physical connections include features such as zoning, logical unit number (LUN) masking, and mapping of storage deices (e.g. disk drives). These features afford security and selective access to the storage arrays 114 to suit a particular architecture or SAN 120 structure. Therefore, the logical connectivity information is indicative of logical paths 160, in which the logical paths 160 include a subset of physical connections 122 defined by at least one of zoning, LUN masking and mapping, as disclosed at step 308. Zoning is indicative of a mapping of ports in a switch connecting manageable entities, as depicted at step 309. LUN masking is indicative of a set of storage devices in a storage array 114 accessible to a particular manageable entity 118, as shown at step 310, and mapping is indicative of a host corresponding to a LUN, as depicted at step 311. Other mechanisms for selective access and logical organization may also be performed.

The qualifier 144 applies the connectivity policy expressed by the connectivity rules 142 to the physical paths 150 and logical paths 160, in which the connectivity policy 142 is operable to qualify the paths 122 between manageable entities 118, as disclosed at step 312. The connectivity policy 142 applied by the qualifier includes connectivity rules 142, such that the rules 142 include physical connectivity rules and logical connectivity rules, as shown at step in which qualifying the paths 150, 160 further includes applying a rule concerning connectivity between manageable entities, as shown at step 313. As indicated above, the connectivity of the SAN 120 includes a set of connections 122 between the various SAN entities 118. Typical, connectivity analysis includes the connections between hosts 112 and storage arrays 114, although connections occur between other SAN entities 118 (manageable entities responsive to the management application 132). At step 314, applying the rules 142 includes, for each of a plurality of pairs of manageable entities 118, identifying a physical path 150 between the pair of manageable entities, as depicted at step 315, and then identifying a redundant physical path 160 between the pair of manageable entities 118, as disclosed at step 316. The rules 142 then attempt to identify a logical path 160 between the pair of manageable entities 118, as depicted at step 316, and identify if a redundant logical path exists between the pair of manageable entities, the logical paths corresponding to the physical path, as shown at step 317. The qualifier 144 then computes a result 145 based on the physical connectivity and logical connectivity between the manageable entities 118, depicted at step 318. The qualifier 144 may apply further connectivity rules 142 to compute the result 145.

Figure 9:
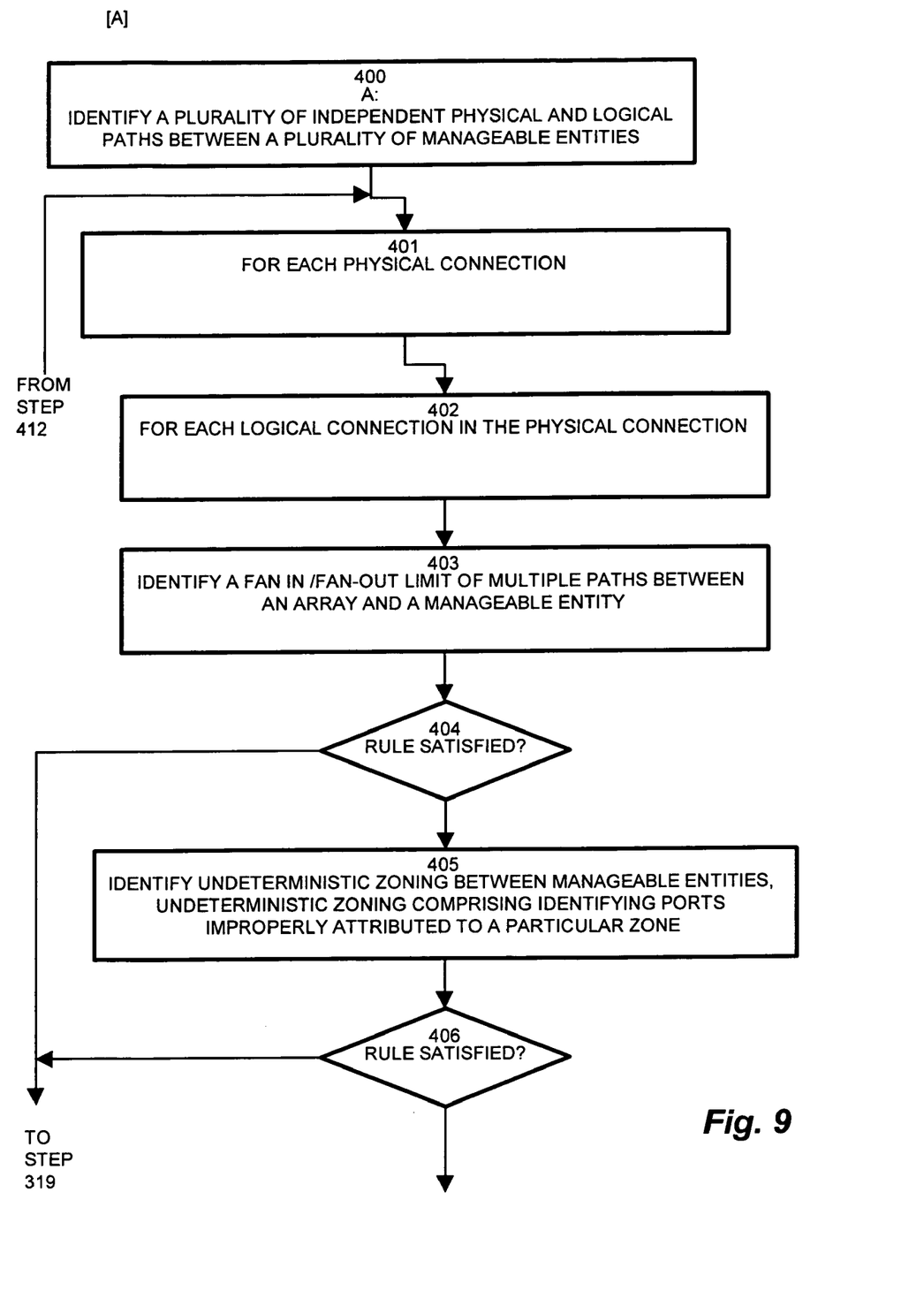
FIGS. 9-10 are a flowchart of stepwise rule application in the analysis of FIGS. 5-8.
Figure 10:
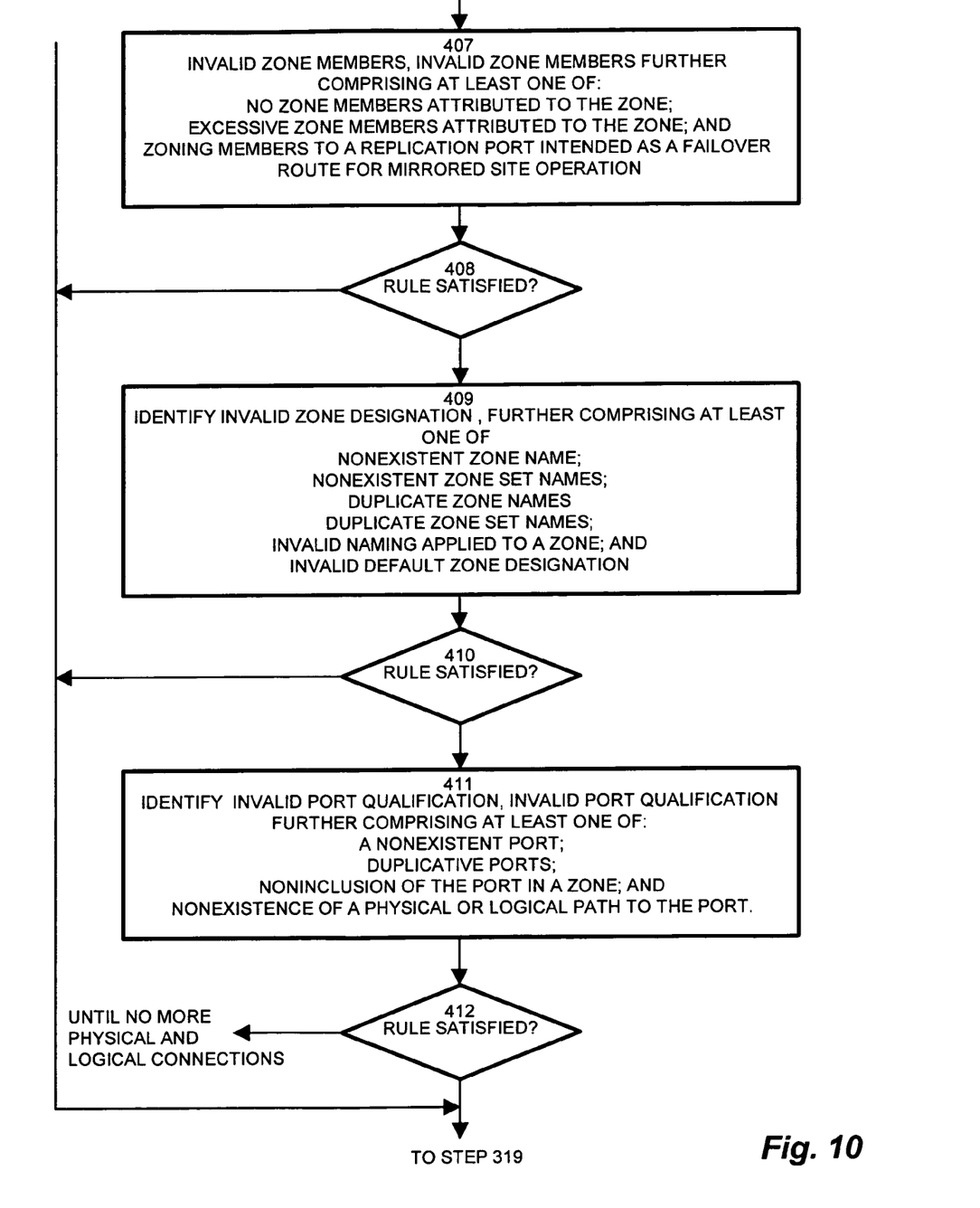

FIGS. 9 and 10, discussed below, depict the application of specific rules in step 318 to compute the applicable results of the qualification. The individual connectivity rules 142 depicted in FIGS. 9 and 10 (steps 400-412 include specific refinements to mandatory and permissible (i.e. optimal) SAN practices in addition to the underlying physical and logical connections depicted above. Such a rule base 142 may be appended and augmented to enhance the robustness of the connectivity advisor 140.

Returning from the rule 142 analysis, the qualifier 144 determines a severity of the result 145 to be reported, as shown at step 319. The path qualification is indicative of the operability of the paths (connections 122) during adverse conditions, the paths including at least one of physical paths 150 or logical paths 160, as shown at step 320. The path qualification identifies at least one of a warning or error, such that an error is indicative of an unavailable path and a warning is indicative of a compromised ability to withstand indirect unavailability of another path (i.e. failover), although not necessarily restricting immediate operation, as shown at step 321. The connectivity advisor 140 then reports the results of the path qualification 145 to the user or operation at the console 136, as depicted at step 322.

FIGS. 9 and 10 depict stepwise application of the rules included in the connectivity rule DB 142. Typically, the target SAN 120 is scanned for each physical 150 and logical path 160 to identify any arrangements violate a particular rule. Therefore, applying the rules 142 includes identifying a plurality of independent physical 150 and logical paths 160 between a plurality of manageable entities 118, as depicted at step 400. From the paths identified by the analyzer 146, for each physical connection 122, the logical paths 160 supported by that physical connection 122 are examined, as shown at step 401. For each logical connection 160 corresponding to the physical connection 122, the qualifier 144 applies the set of rules 142 in an iterative manner, as shown at step 402.

Applying the rules 142 includes identifying a fan-in and/or fan-out limit of multiple paths between an array 114 and a manageable entity (i.e. host 112), as shown at step 403. If an inconsistency with the rules 142 is detected, then the results are reported, as depicted above at step 319. If the rule is satisfied, as depicted at step 404, then the qualifier 144 identifies undeterministic zoning between manageable entities 118, in which undeterministic zoning includes identifying ports 152 improperly attributed to a particular zone, as depicted at step 405. If the rule is satisfied, as shown at step 406, then the qualifier 144 identifies invalid zone members, such that invalid zone members further include one or more of a) no zone members attributed to the zone, b) excessive zone members attributed to the zone, and c) zoning members to a replication port intended as a failover route for mirrored site operation, as shown at step 407

If the rule is satisfied, at step 408, then the qualifier 144 identifies an invalid zone designation, which may include one or more of a) nonexistent zone name, b) nonexistent zone set names, c) duplicate zone names, d) duplicate zone set names, e) invalid naming applied to a zone and e) invalid default zone designation, as depicted at step 409. If the rule is satisfied, at step 410, then the qualifier 144 identifies invalid port 152 qualification, such that invalid port 152 qualification includes one or more of a) a nonexistent port, b) duplicative ports, c) noninclusion of the port in a zone and d) nonexistence of a physical or logical path to the port, as shown at step 411. A check is performed, at step 412 to determine if the rule is satisfied, and control reverts to step 319 to report the results 145.

Those skilled in the art should readily appreciate that the programs and methods for physical and logical SAN fabric analysis as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for physical and logical SAN fabric analysis has been particularly shown and described with references to embodiments thereof, it will be understood by those skilled in the art that various changes in form and details may be made therein without departing from the scope of the invention encompassed by the appended claims.

What is claimed is:

1. A computer-implemented method for analyzing a storage area network comprising:
   a processor programmed to perform the process steps comprising:
   determining a connectivity of a storage area network (SAN), the connectivity defining interconnections between manageable entities in the SAN, including determining an existing physical connectivity at a port-to-port connection level;
   computing, from the connectivity, physical paths between the manageable entities;
   computing, from the physical paths and logical connectivity information, logical paths between the manageable entities, wherein the logical connectivity information is indicative of logical paths, the logical paths including a subset of physical connections defined by at least one of zoning, logical unit number (LUN) masking and mapping;
   applying a connectivity policy to the physical paths and logical paths, the connectivity policy qualifying paths between manageable entities;
   reporting the results of the path qualification; and
   wherein physical connections occur between manageable entities via a physical fabric, the manageable entities including at least one host and at least one storage array, the at least one host and the at least one storage array having one or more ports, the existing physical connectivity including at least one connection occurring between a port on the at least one host and a port on the at least one storage array.

2. The method of claim 1 wherein the path qualification is indicative of the operability of the paths during adverse conditions, the paths including at least one of physical paths or logical paths;
   wherein the connectivity policy includes rules, the rules comprising physical connectivity rules and logical connectivity rules, such that qualifying the paths further comprises:
   applying a rule concerning connectivity between manageable entities;
   computing a result based on the physical connectivity and logical connectivity between the manageable entities;
   determining a severity of the result; and
   wherein the physical connections occur between manageable entities comprising a host and a storage array via a physical fabric, each of the host and storage array having ports, the physical connection occurring between a port on the host and a port on the storage array.

3. The method of claim 1, further comprising:
wherein the connectivity is indicative of at least one physical connection between manageable entities in the SAN, the physical connection defining a path between manageable entities;
wherein zoning is indicative of a mapping of ports in a switch connecting manageable entities;
wherein LUN masking is indicative of a set of storage devices in a storage array accessible to a particular manageable entity; and
wherein mapping is indicative of a host corresponding to a LUN.

4. The method of claim 3 wherein:
the physical paths define a physical fabric; and
a subset of the physical paths define a logical fabric, the logical fabric corresponding to a zone of manageable entities.

5. The method of claim 3 wherein computing physical paths and logical paths employs connectivity information indicative of recognized ports defining a path and avoids configuration information in stored configuration files.

6. The method of claim 3 wherein the path qualification identifies at least one of a warning or error, an error indicative of an unavailable path and a warning indicative of a compromised ability to withstand indirect unavailability of another path.

7. The method of claim 2 wherein applying the rules includes, for each of a plurality of pairs of manageable entities:
identifying a physical path between the pair of manageable entities;
identifying a redundant physical path between the pair of manageable entities;
identifying a logical path between the pair of manageable entities; and
identifying a redundant logical path between the pair of manageable entities, the logical paths corresponding to the physical path.

8. The method of claim 2 wherein applying the rules includes;
identifying a plurality of independent physical and logical paths between a plurality of manageable entities; and
identifying undeterministic zoning between manageable entities, undeterministic zoning comprising identifying ports improperly attributed to a particular zone.

9. The method of claim 2 wherein applying the rules includes identifying a fan in/fan-out limit of multiple paths between an array and a manageable entity.

10. The method of claim 2 wherein applying the rules includes identifying invalid zone members, invalid zone members further comprising at least one of:
no zone members attributed to the zone;
excessive zone members attributed to the zone; and
zoning members to a replication port intended as a failover route for mirrored site operation.

11. The method of claim 2 wherein applying the rules further comprises identifying invalid zone designation, further comprising at least one of
nonexistent zone name;
nonexistent zone set names;
duplicate zone names
duplicate zone set names;
invalid naming applied to a zone; and
invalid default zone designation.

12. The method of claim 2 wherein applying the rules further comprises identifying invalid port qualification, invalid port qualification further comprising at least one of:
a nonexistent port;
duplicative ports;
noninclusion of the port in a zone; and
nonexistence of a physical or logical path to the port.

13. A SAN management server for analyzing a storage area network comprising:
a connectivity advisor operable to determine a connectivity of a storage area network (SAN), the connectivity defining interconnections between manageable entities in the SAN, including determining an existing physical connectivity at a port-to-port connection level;
an analyzer in the connectivity advisor operable to compute, from the connectivity, physical paths between the manageable entities, the analyzer further operable to compute, from the physical paths and logical connectivity information, logical paths between the manageable entities, wherein the logical connectivity information is indicative of logical paths, the logical paths including a subset of physical connections defined by at least one of zoning, logical unit number (LUN) masking and mapping;
a qualifier in the connectivity advisor operable to apply a connectivity policy to the physical paths and logical paths, the connectivity policy operable to qualify paths between manageable entities;
an interface to a console operable to reporting the results of the path qualification; and
wherein physical connections occur between manageable entities via a physical fabric, the manageable entities including at least one host and at least one storage array, the at least one host and the at least one storage array having one or more ports, the existing physical connectivity including at least one connection occurring between a port on the at least one host and a port on the at least one storage array.

14. The server of claim 13 wherein the path qualification is indicative of the operability of the paths during adverse conditions, the paths including at least one of physical paths or logical paths, the connectivity policy includes rules, the rules comprising physical connectivity rules and logical connectivity rules, the qualifier further operable to
apply a rule concerning connectivity between manageable entities;
compute a result based on the physical connectivity and logical connectivity between the manageable entities; and
determine a severity of the result; and
wherein the connectivity is indicative of at least one physical connection between manageable entities in the SAN, the physical connection defining a path between manageable entities, the logical connectivity information is indicative of logical paths, the logical paths including a subset of physical connections defined by at least one of zoning, LUN masking and mapping, wherein:
zoning is indicative of a mapping of ports in a switch connecting manageable entities;
LUN masking is indicative of a set of storage devices in a storage array accessible to a particular manageable entity; and
mapping is indicative of a host corresponding to a LUN.

15. A computer program product having a non-transitory computer-storage medium operable to store computer program logic embodied in computer program code encoded thereon as an encoded set of processor based instructions for performing a method for analyzing a storage area network comprising:

computer program code for determining a connectivity of a storage area network (SAN), the connectivity defining interconnections between manageable entities in the SAN, including determining an existing physical connectivity at a port-to-port connection level;

computer program code for computing, from the connectivity, physical paths between the manageable entities;

computer program code for computing, from the physical paths and logical connectivity information, logical paths between the manageable entities, wherein the logical connectivity information is indicative of logical paths, the logical paths including a subset of physical connections defined by at least one of zoning, logical unit number (LUN) masking and mapping;

computer program code for applying a connectivity policy to the physical paths and logical paths, the connectivity policy operable to qualify paths between manageable entities; and computer program code for reporting the results of the path qualification, qualification, wherein physical connections occur between manageable entities via a physical fabric, the manageable entities including at least one host and at least one storage array, the at least one host and at least one storage array having one or more ports, the existing physical connectivity including at least one connection occurring between a port on the at least one host and a port on the at least one storage array.

16. The method of claim 1, wherein applying the connectivity policy to the physical paths and logical paths includes qualifying paths based on the port-to-port connection level without qualifying paths based on an interoperability matrix of device-to-device connections.

17. The method of claim 16, wherein the path qualification is indicative of the operability of the paths during adverse conditions, the paths including at least one of physical paths or logical paths; and wherein the connectivity policy includes rules, the rules comprising physical connectivity rules and logical connectivity rules, such that qualifying the paths further comprises:

applying a rule concerning connectivity between manageable entities; and computing a result based on the physical connectivity and logical connectivity between the manageable entities.

18. The method of claim 17 wherein applying the rules includes, for each of a plurality of pairs of manageable entities:

identifying a physical path between the pair of manageable entities;

identifying a redundant physical path between the pair of manageable entities;

identifying a logical path between the pair of manageable entities; and identifying a redundant logical path between the pair of manageable entities, the logical paths corresponding to the physical path.

19. The method of claim 18, wherein applying the connectivity policy to qualify paths includes:

specifying a warning upon identifying that there is no redundant physical connection between the at least one host and the at least one storage array; and specifying a warning upon identifying an absence of two independent logical paths between the at least one host and the at least one storage array.

* * * * *